(12) United States Patent
Decker

(10) Patent No.: US 7,891,375 B2
(45) Date of Patent: Feb. 22, 2011

(54) SOFTSTART VALVE MEANS

(75) Inventor: Andreas Decker, Esslingen (DE)

(73) Assignee: Festo AG & Co. KG, Esslingen (DE)

( * ) Notice: Subject to any disclaimer, the term of this patent is extended or adjusted under 35 U.S.C. 154(b) by 501 days.

(21) Appl. No.: 11/998,476

(22) Filed: Nov. 30, 2007

(65) Prior Publication Data
US 2008/0128036 A1    Jun. 5, 2008

(30) Foreign Application Priority Data
Dec. 5, 2006    (EP) .................................. 06025084

(51) Int. Cl.
*F15B 13/043*    (2006.01)

(52) U.S. Cl. .................... 137/596.15; 137/596.1; 137/596.16

(58) Field of Classification Search .......... 137/596.1, 137/596.15, 596.16, 596.18; 251/26
See application file for complete search history.

(56) References Cited

U.S. PATENT DOCUMENTS

| | | | | |
|---|---|---|---|---|
| 4,561,464 A * | 12/1985 | Frantz | ................... | 137/596.18 |
| 5,067,519 A * | 11/1991 | Russell et al. | .......... | 137/596.14 |
| 5,137,254 A * | 8/1992 | Aardema et al. | ............... | 251/35 |
| 5,218,997 A * | 6/1993 | Dunwoody | ............. | 137/596.18 |
| 5,337,788 A * | 8/1994 | Nelson | ..................... | 137/627.5 |
| 5,381,828 A * | 1/1995 | Kimura et al. | .............. | 137/596 |
| 5,421,545 A * | 6/1995 | Schexnayder | ............ | 251/30.02 |
| 5,645,263 A * | 7/1997 | Aardema | ................. | 251/30.02 |
| 5,669,422 A * | 9/1997 | Tarusawa | ............... | 137/625.64 |
| 6,557,822 B1 * | 5/2003 | Yoshino | ....................... | 251/33 |
| 6,637,462 B2 * | 10/2003 | Foster et al. | ............. | 137/627.5 |
| 2006/0070673 A1 * | 4/2006 | Decker et al. | ............... | 137/628 |

FOREIGN PATENT DOCUMENTS

DE    20 2004 015 468 U1    2/2005

OTHER PUBLICATIONS

"Pneumatische Steuerungen", Werner Deppert, Kurt Stoll, Vogel Verlag 10. Auflage 1994, Seiten 150 und 161.
"Der Pneumatic-Katalog", Ausgabe 1997/1998, RESTO AG & Co, Seite 9.1/42-1.

* cited by examiner

*Primary Examiner*—John Rivell
*Assistant Examiner*—Kevin Murphy
(74) *Attorney, Agent, or Firm*—Hoffmann & Baron, LLP

(57) ABSTRACT

A softstart valve means comprises a main valve member which is only switched over after a certain time from a closed position into an open position. The opening force required for switch over of the main valve member can be produced selectively in a manner dependent from pressure obtaining in a secondary duct or in a time dependent fashion. The respective operational mode can be selected by actuation of switch over means.

19 Claims, 4 Drawing Sheets

SOFTSTART VALVE MEANS

BACKGROUND OF THE INVENTION

The invention relates to a softstart valve means, comprising a main valve member placed between a primary duct conducting pressure medium at a primary pressure and a secondary duct, said main valve member being biased, or able to be biased by a closing force into a closed position disconnecting the connection between the primary duct and the secondary duct, said main valve member being able to be switched over by an oppositely acting opening force overriding the closing force into an open position opening the connection between the primary duct and the secondary duct, the opening force being derived in a secondary pressure controlled operational mode of the valve means by the gradually increasing secondary pressure of the pressure medium, such pressure medium flowing, bypassing the main valve member, by way of a choke means from the primary duct into the secondary duct.

Such a softstart valve means designed for secondary pressure controlled operation is described in the textbook "Pneumatische Steuerungen", by Werner Deppert and Kurt Stoll, published by Vogel Verlag, 10th edition, 1994 pages 160 and 161. The main valve member of a shut off valve in the form of a two-position valve is in this case placed on the connection between a primary duct connected with a pressure source and a secondary duct connected with the loads to be supplied and selectively can shut off (closed position) or open (open position) the connection. Normally the main valve member is in this case biased into the closed position by a closing force based on the primary pressure.

Following the switching on of the valve means the pressure medium, flowing by way of primary duct, may bypass the closed main valve by way of a first choke means into the secondary duct, it flowing by way of a choke means into the secondary duct. The secondary pressure obtaining in the secondary duct is returned for producing a servo or setting force acting on the main valve and switches the main valve into the open position, when the secondary pressure (and the said setting force) has reached a predetermined opening force. Thus it is possible to ensure that the softstart valve means only permits unchoked passage of fluid, when the secondary pressure has risen to a certain pressure level. Accordingly all in all a relatively slow build up of pressure is achieved in the connected loads and the occurrence of pressure surges is prevented, which could lead to damage or accidental rapid movements of the connected loads.

There are however applications in which using a softstart valve controlled in a manner dependent on the secondary pressure only an insufficient operational mode is possible. If for example on the secondary side a relatively high rate of fluid consumption occurs, it may in certain circumstances last a long time before the secondary pressure necessary for producing the opening pressure is built up on the secondary side, something which may considerably delay the putting plant into operation. Under unfavorable conditions there may be no switching of the main valve member into the open position at all.

In order to deal with such unsatisfactory condition purely time controlled or timed softstart valves have being become known, in which the main valve member is switched gradually and in a manner independent of the currently obtaining secondary pressure after a predetermined period of time into the open position. As an example for such a softstart valve reference may be had to the product catalog "Der Pneumatik-Katalog", issue of 1997/1998 of FESTO AG & Co, page 9.1/42-1 with a description of a so-called pressure build up valve. Since in the case of such a purely time controlled valve no interrogation of the secondary pressure and accordingly of the pressure obtaining at the connected loads takes place, there is however the risk, in the case of improper use, of a premature opening of the main valve member being entailed, possibly with resulting damage owing to an excessive pressure surge.

In many cases account could be taken of the respective application by having an appropriate selection of the type of softstart valve utilized. In the case of changing operational conditions this has however turned out to be impractical. As a rule there is no realistic possibility of modification of a plant to suit different applications.

SUMMARY OF THE INVENTION

The present invention has the aim of proposing measures which in most cases render possible a specific gradual build up of pressure tailored to requirements.

In order to achieve this aim a softstart valve means of the type initially mentioned is provided with switch over means, which permit the switching over of the operational mode of the valve means between an operational mode controlled by the secondary pressure and a time controlled operational mode switching over the main valve independently of the secondary pressure purely time dependent into the open position.

The switch over means of this softstart valve means in accordance with the invention preferably comprise a switch over valve able to be actuated to change the operational mode and which, dependent on the switching position, causes the internal switching of the components of the softstart valve means for the respective operational mode.

In the case of such a softstart valve means the user has the possibility of selecting the operational mode in a manner dependent on the respective case of application specifically without replacing or modifying the softstart valve means or. Even in the event of frequently changing conditions of use it is accordingly simply and quickly possible to switch over between the secondary pressure controlled operational mode and the purely time controlled operational mode.

The softstart valve means may be utilized in all cases in which during starting up plant or equipment a gradual build up of pressure is strived at. For instance the softstart valve means can be a component of a valve cluster joined together with several multiway valves to form a subassembly. A further particularly advantageous application is use as a component of a preferably modularly designed compressed air conditioning device employed for servicing compressed air. In this case the softstart valve means may, more particularly when it is designed as a compact valve unit, perform the function of a valve.

Further advantageous developments of the invention are defined in the dependent claims.

The softstart valve means is more especially so designed that during the time controlled operational mode the secondary pressure does not exert any resulting setting forces on the main valve member. To produce the necessary opening force the main valve member is instead of this acted upon in its open position by a pressure medium which flows to it in a choked manner without a connection with the secondary duct.

In the case of a convenient further development the softstart valve means is so designed that during the time controlled operational mode the choked supply, responsible for producing the opening force, of the pressure medium takes place by way of that choke means, which during the operational mode, dependent on secondary pressure, is responsible for the build up of pressure in the secondary duct. During the time controlled operational mode the connection between this choke means and the secondary duct is disconnected so that a build up of pressure independent of the secondary pressure may take place for the production of the opening force.

In this connection it is an advantage if the main valve member is gradually switched over into the open position by the choked supply of fluid, the build up of pressure in the secondary duct not taking place by way of a parallel choke means but rather by way of the transfer cross section increasingly upregulated by the main valve member so that the choke function is practically transferred to the main valve member.

In the fluid connection present in the time controlled operational mode between the choke means and the main valve member there is preferably a further choke means, termed an auxiliary choke means. The flow rate permitted by same is preferably less than that of the upstream choke means. Since in the time controlled operational mode the fluid volume required for the buildup of the necessary opening force is generally substantially less than during the secondary pressure controlled operational mode, it is possible in this fashion for there to be a predetermination, suited to the particular application, of the pressure build up time.

The deprivation of effect, aimed at in the time controlled operational mode, of the secondary pressure as regards the main valve member may more particularly be achieved if the secondary pressure is applied, in addition to application to the opening face of the of the main valve member during secondary pressure dependent mode operation, also to an oppositely orientated compensation face of equal area of the main valve member. This will mean the main valve member is balanced as regards pressure force for the secondary pressure.

In the case of a further embodiment of the softstart valve means during the time controlled operational mode the choked supply flow of the pressure medium responsible for producing the opening force, finds its way by way of a choke means termed a further choke means, which is present in addition to that choke means, via which the build up of pressure occurs in the secondary duct during the operational mode dependent on secondary pressure. In this case however the fluid connection present during the secondary pressure dependent operational mode between the secondary duct and the main valve member is interrupted.

In all cases there is preferably a provision such that the closing force acting on the main valve member results from a fluid control pressure, which is more particularly due to a pressure medium tapped from the primary duct. The control pressure may in particular correspond to the primary duct. Nevertheless for reasons of strength as a rule it is best to have an additional spring means with a smaller setting force.

For switching the softstart function on and off the softstart valve means preferably has a control valve means associated with the secondary duct. It can be selectively positioned in a working position permitting fluid flow or a discharge position when the valve is turned off. In the in the discharge position there is a relief of pressure, more especially venting the secondary duct to the atmosphere.

The control valve means may in principle be designed for manual activation. It is particularly preferred however to have operation by means of an auxiliary valve.

To the extent that the switching over means comprise a switch over valve, it is also preferred to provide for a manual or electrical manner of operation.

In the following the invention will be explained with reference to the accompanying drawings in detail.

BRIEF DESCRIPTION OF THE DRAWINGS

FIGS. 2 through 4 show the secondary pressure controlled operational mode, and FIGS. 5 through 7 show the time controlled operational mode.

DETAILED DESCRIPTION OF THE PREFERRED EMBODIMENTS

Figure 1:
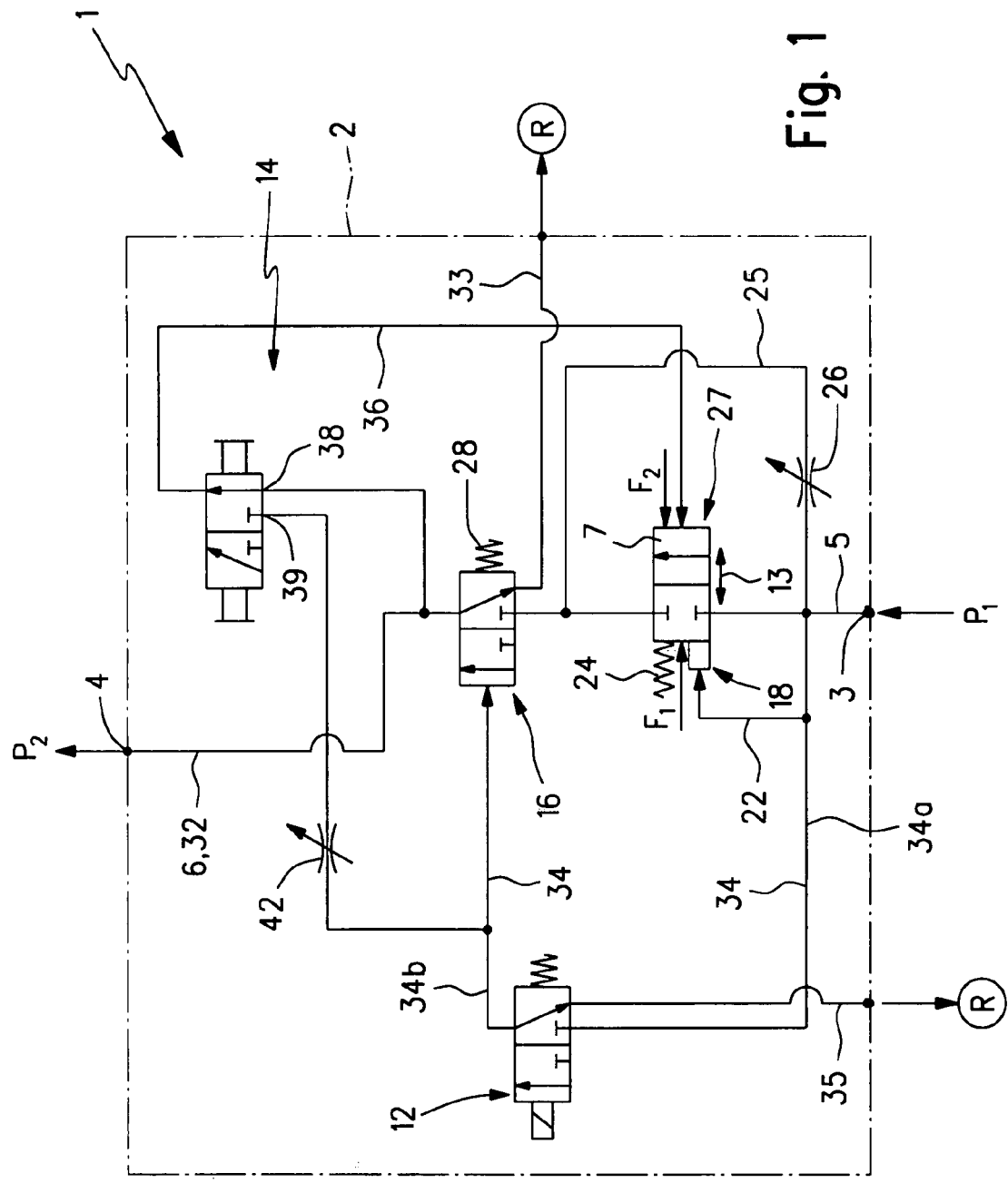
FIG. 1 shows a preferred first design of the softstart valve means in accordance with the invention, illustrated in the form of a circuit diagram.

Both the first working example depicted in FIG. 1 and also the second working example illustrated in FIGS. 2 through 7 of the softstart valve means generally referenced 1 are designed as a valve unit, in which all components are collected together as a subassembly. This facilitates the installation at the site of use and more particularly the integration as a module in a modularly designed compressed air conditioning or servicing device.

The softstart valve means 1 simply termed a "softstart valve" comprises a housing 2, which in the working example in accordance with FIG. 1 is only indicated in chained lines, on which a fluid inlet port 3 and a fluid outlet port 4 are provided.

The inlet port 3 belongs to a primary duct 5 running in the housing 2 and renders possible the connection of a pressure source, not illustrated in detail, which supplies a fluid pressure medium at a primary pressure P1 and in more particularly in form of compressed air. As an alternative the softstart valve 1 may also be operated with another gas or with some other fluid pressure medium.

The outlet port 4 belongs to a secondary duct 6 running in the housing 2 by way of which the pressure medium supplied by way of the primary duct 5 leaves the softstart valve 1 at a secondary pressure P2 again in order to be supplied to one or more loads (not illustrated). In the case of the at least one load it is a question for example of a valve, a drive run on fluid power or some other means.

On the connection between the primary duct 5 and the secondary duct 6 a preferably linearly moving main valve member 7 is placed. Same controls an associated transfer opening 8, which is only depicted in more detail in the second working example. In this case the main valve member 7 may be in the form of a valve spool with a peripheral switching face or, more preferably and as in the working example, in the form of a seat valve member, which can cooperate with a valve seat 12 surrounding the transfer opening 8.

Figure 3:
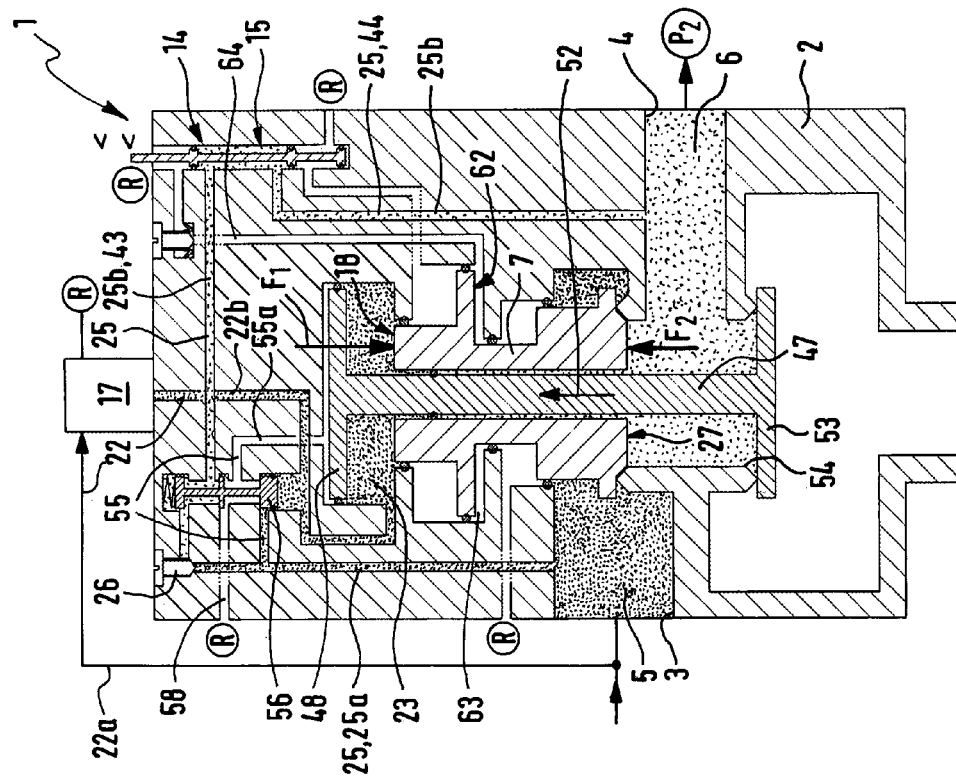
FIGS. 2 through 7 show an alternative design of the softstart valve means in a longitudinal section during various different operation phases.
Figure 5:
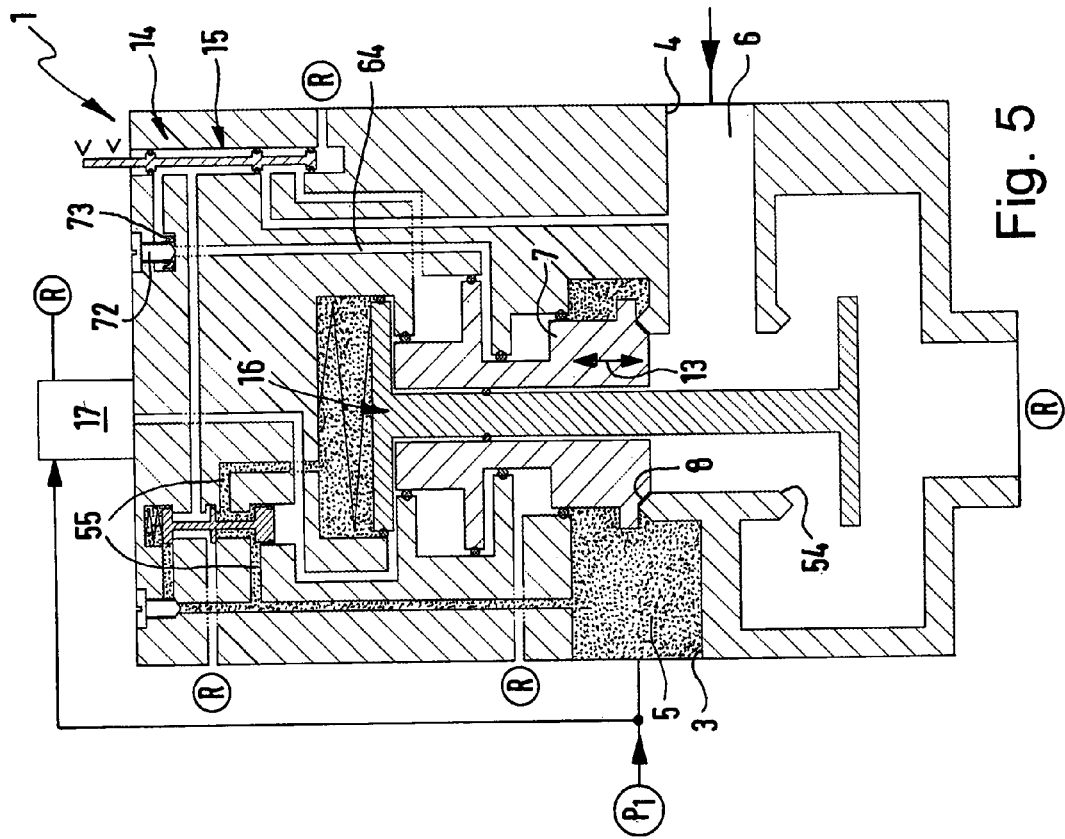
Figure 4:
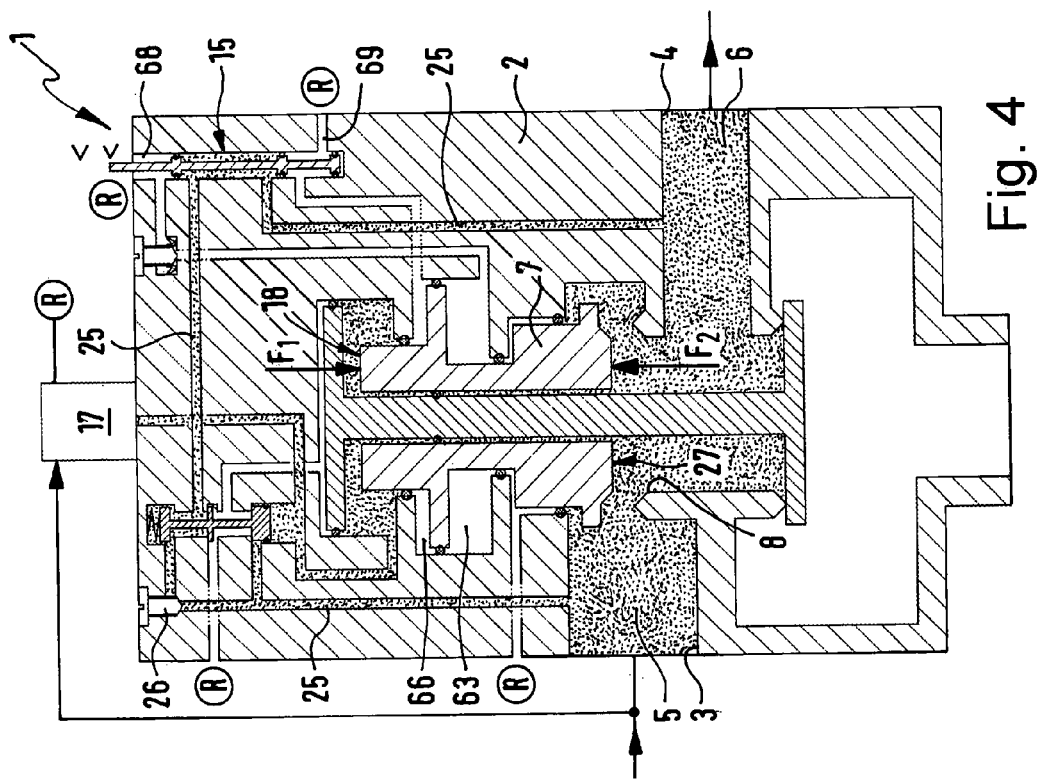
Figure 6:
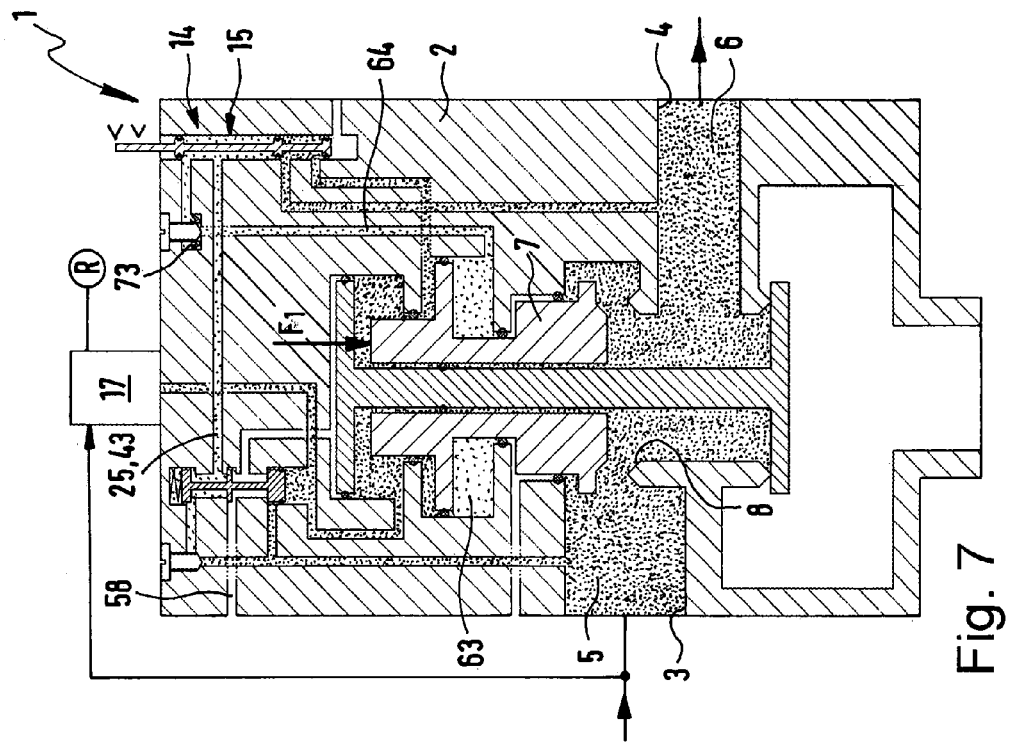
Figure 7:
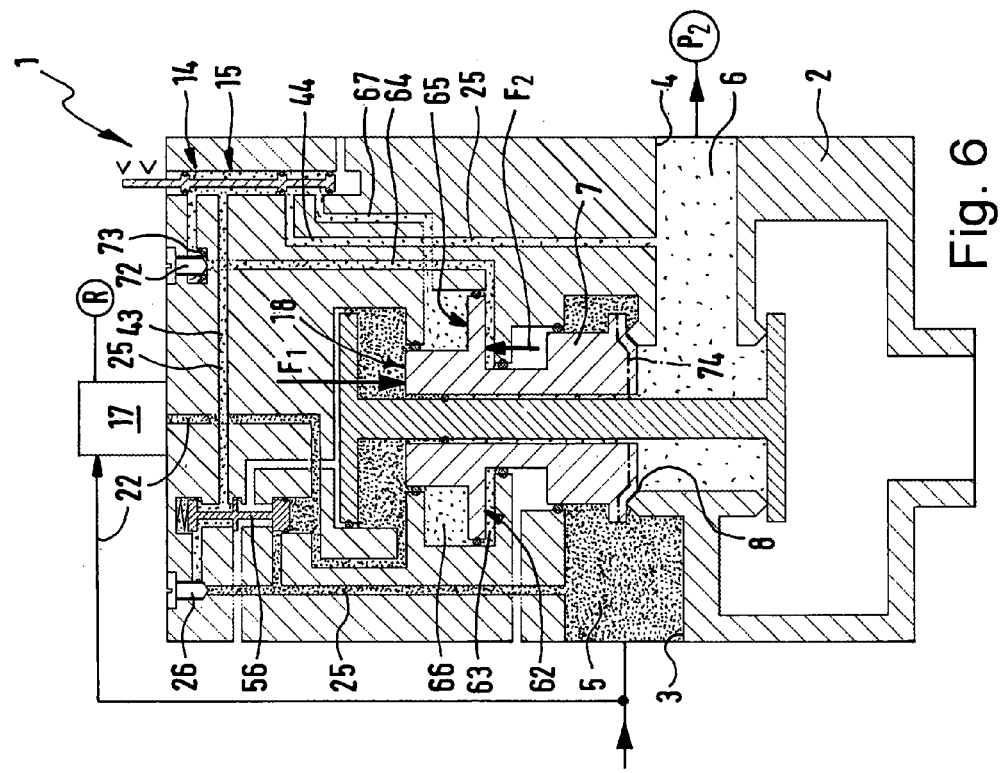

By dint of performing a linear switching over movement 13 indicated by a double arrow the main valve member 7 is able to be switched over between a closed position to be seen in the FIGS. 1 through 3, 5 and 6 and an open position illustrated in FIGS. 4 and 7. In the closed position the direct fluid connection between the primary duct 5 and the secondary duct is shut off and in the open position it is available for flow.

The softstart valves 1 are so designed that as from a switching on time, with the main valve member 7 still in the closed position, pressure medium may flow subject to a choking effect into the secondary duct 6 in order to cause a gradual build up of pressure there. It is only when as a result the secondary pressure gets near the level of the primary pressure or reaches it that the main valve member 7 is opened to make the full flow cross section available. In this case the softstart valve 1 may be selectively operated in either of two modes, i.e. in a secondary pressure controlled operational mode or in time controlled operational mode. In the former case the main valve member 7 switches over in a manner dependent on the level of the secondary pressure into the open position and independently of the time elapsing. A limit value of the secondary pressure may be set, on reaching which the main valve member 7 is switched over into the open position. In the second mentioned case the switch over of the main valve member 7 into the open position is purely timed or time controlled, i.e. after the expiry of a predetermined time and independently of the pressure obtaining in the secondary duct 6.

The softstart valve 11 is fitted with switch over means 14 which render possible a switch over between the two operational modes. An essential component of the switch means 14 is in this case and in both working example a switch over valve 15, which is able to be shifted into the first switching position for the secondary pressure controlled operational mode and a second switching position for the time controlled operational mode, it producing in these switching position different internal fluid circuit connections for the softstart valve, which are responsible for either a secondary pressure dependent or a time dependent generation of an opening force $F_2$ to switch over the main valve member 7 against the closing force $F_1$ into the open position.

For the switching on and switching off of the softstart valve 1 a control valve means 16 is present. Its switch over into a working position constitutes the switch on point in time relevant for the start of softstart functionality. In this respect it can readily be a control valve means able to be switched over by a purely manual force. Preferably however it has an associated electrically controlled auxiliary valve 17 for its actuation, which may practically act as a pilot valve for the control valve means. In the particular working example it is a question of an electrically operated 3/2 way valve, and more especially a solenoid valve.

In order to produce the closing force $F_1$ the main valve member 7 is provided with a closing face 18 able to be acted upon by a control fluid at a certain control pressure. In the case of both working examples the control fluid is constituted by a pressure medium which is tapped from the primary duct 5. The control pressure therefore preferably corresponds to the primary pressure.

The control pressure is supplied to the closing face 18 by way of first actuating duct 22. In the working example of FIG. 1 this takes place through a direct connection between the closing face 18 and the primary duct 5 with the result that the closing force is always present independently of the switching condition of the auxiliary valve 17, when the primary duct 5 is under pressure.

In the working embodiment illustrated in FIGS. 2 through 7 the auxiliary valve 17 is placed on the first actuating duct 22. An input branch 22a of the actuating duct 22 joins the primary duct 5 with the input of the auxiliary valve 17, whereas an output branch 22b of the first actuating duct 22 joins the output of the auxiliary valve 17 with a first actuating chamber 23, which inter alia is delimited by the closing face 18. In the non-actuated home state of the auxiliary valve 17 the connection between the input branch 22a and the output branch 22b is interrupted so that the main valve member 7 is not act upon by a fluid closing pressure. This will only be the case when the two duct branches 22a and 22b are joined together.

The closed position is also the home position 7 of the main valve member. It is assumed by the main valve member 7 in the completely pressureless state of the softstart valve 1. This is ensured by a first spring means 24 which actuates the main valve member 7 in the closed position.

In the working embodiment illustrated in FIG. 1 the first spring means 24 constantly acts in the closing direction on the main valve member 7. In the working embodiment illustrated in FIGS. 2 through 7 the closing action of the first spring means 24 is restricted to a condition in which the control valve means 16 is in its discharge position.

In the case of both working examples the gradual build up of pressure in the secondary duct occurs at least during the secondary pressure controlled operational mode by way of a bypass duct 25 circumventing the main valve member 7 and on which a preferably adjustable choke means 26 is placed. The choke means 26 limits the flow rate so that the supply of the pressure medium into the secondary duct 6 occurs more slowly than when the main valve member 7 is open.

In the case of both working embodiments an actuating face, termed the opening face 27, is present on the main valve member 7 facing in the opposite direction to the closing face 18, such opening face being subjected at least during the primary pressure controlled operational mode to a gradually increasing actuating pressure, from which the opening force $F_2$ results. If this opening force $F_2$ exceeds the oppositely acting closing force $F_1$ the main valve member 7 will switch over into the open position.

In the case of both working embodiments the actuating pressure effective during the secondary pressure controlled operational mode at the opening face 27 is derived from the secondary pressure gradually building up in the secondary duct 6, it being preferably equal to this secondary pressure. The pressure medium in this case can be tapped directly from the secondary duct 6.

The two working examples will be described separately in the following in the absence of any indication to the contrary.

In the working embodiment illustrated in FIG. 1 the control valve means 16 is placed on the secondary duct 6. Using spring means 28 it is biased into the discharge position indicated in the drawing and in which it interrupts passage of fluid through the secondary duct 6 and at the same time connects the terminal duct branch 32 leading to the outlet port 4, of the secondary duct with a discharge duct 33 leading to the atmosphere R. The bypass duct 25 opens between the main valve member 7 and the control valve means 16 into the secondary duct 6 and is shut off in the closed position of the control valve means 16.

The control valve means 16 is able to be switched over by a fluid pressure signal into a working position, in which it opens the fluid passage through the secondary duct 6 and at the same time disconnects the outlet duct 33. The fluid pressure signal is able to be supplied by way of a control duct 34 branching from the primary duct 5, and on which the auxiliary valve 17 is placed. In the non-actuated home position of the auxiliary valve 17 the control duct 34 is interrupted and the duct branch 34b leading to the control valve means 16 is joined by way of a discharge duct 35 with the atmosphere R.

In the actuated open position of the auxiliary valve 17 the passage for fluid through the control duct 34 is opened up and the discharge duct 35 is disconnected.

The first actuating duct 22 may be branched from the initially placed duct branch 34a of the control duct 34.

In the case of both operational modes the actuating pressure is switched to the opening face 27 by way of an actuating duct 36. The latter is connected at the other end with the outlet 37 of the switch over valve 15.

The switch over valve 15 possesses two inlets 38 and 39, of which the first inlet 38 is joined directly with the secondary duct 6, to wit in particular with the terminal duct branch 32. The second inlet 39 is joined via a further choke means 42 with the terminal duct branch 34a of the control duct 34.

During operation of the softstart valve 1, when the auxiliary valve 17 is in the open position and accordingly the control valve means 16 is in the operating position, the secondary pressure will be present at the first inlet 38, whereas the second inlet 39 is supplied via the further choke means 42 with pressure medium from the primary duct 5. If there is no auxiliary valve 17 the duct with the further choke means 42 on it can be also directly joined with the primary duct 5.

The switch over valve 15 may selectively be set in the first switching position as illustrated in the drawing for the secondary pressure controlled operational mode or in a second switching position for the time controlled operational mode. In the actual working example actuation takes place manually, although electrical operation would be possible as well. The switch over valve 15 is a bistable valve and therefore remains automatically in the respectively set position.

The further choke means 42 is preferably designed with choke properties such that it is adjustable.

As a rule the softstart valve 1 will be operated with a design such that there is a heavier choking effect at the further choke means 42 than at the choke means 26 associated with the main valve member 7.

The switched state of the switch over valve 15 is without effect on the fluid actuation effective at the closing face 18. Here there is always the control pressure producing the closing force $F_1$, i.e. in the present case the primary pressure. Dependent on the switching position of the switch over valve 15 the source of actuating fluid for the opening face 27 will be changed. The face will be supplied in the first switching position of the switch over valve 15 from the secondary duct 6 and in the second switching position via the further choke means 42, from the primary duct 1. The respectively other source of actuating fluid is in this case disconnected from the opening face 27 or, respectively, from the actuating duct 36.

The softstart valve 1 in FIG. 1 may be secondary pressure controlled if the switch over valve 15 is shifted into the first switching position. Accordingly the secondary pressure is switched to the opening face 27 and the main valve member 7 will only switch out of the closed position, so far assumed, into the open position when an opening force $F_2$ obtains exceeding the opposite closing force. By selection of suitable area relationships between the opening face 27 and the closing face 18 the threshold value of the secondary pressure the switching over may be set. It is preferred to have a setting at a threshold value corresponding to half the primary pressure.

In order to operate the softstart valve 1 with time control the switch over valve 15 is shifted over into the second switching position. Accordingly the secondary pressure no longer affects the switch over behavior of the main valve member 7. As the actuating pressure the pressure obtaining downstream from the further choke means 42 functions, which gradually increases in a time dependent fashion with the fluid of pressure medium via the further choke means 42 from the primary duct 5 to the opening face 27. Once again the main valve member 7 will switch over into the open position, when the actuating pressure as set by the area ratios has reached a predetermined threshold value.

For turning off the softstart valve 1 the auxiliary 17 is shifted back into the home position. Accordingly via the control duct 34 and the discharge duct 35 there will be a discharge of pressure at the second outlet 39 and furthermore a reduction of the fluid pressure signal responsible for setting the working position of the control valve means 16. The reduction will entail a switch over of the control valve means 16 into the discharge position with the result that the terminal duct branch 32, leading to the outlet port 4, of the secondary duct 6 and the first inlet 38 will be relieved of pressure by way of the discharge duct 33.

Irrespectively of the position assumed by the switch over valve 15 on such turning off of the softstart valve 11, there will be a relief of pressure in the actuating duct 36 and accordingly at the opening face 27 with the result that the main valve member 7 will move back into its closed position.

It will be clear that a significant feature of the softstart valve 1 is that the secondary pressure is switched to be without an effective force during the time controlled operational mode as regards the main valve member 7 and the main valve member 7 will, instead, for producing the opening force, be subjected to pressure medium supplied in a choked manner without. This will also apply furthermore for the second working example of FIGS. 2 through 7 described in the following.

In the case of this second working embodiment the switch over valve 15 is placed on the bypass duct 25 i.e. on the terminal duct branch 25b arranged downstream from the choke means 26 leading to the secondary duct 6. It divides up this terminal duct branch 25b into a first duct branch portion 43 leading to the choke means 26 and furthermore a second duct branch portion 44 opening into the secondary duct 6. The switch over valve 15 may assume the first switching position illustrated in FIGS. 2 through 4, for secondary pressure controlled operation in which it joins the two duct branch portions 43 and 44 with each other and accordingly creates a fluid connection bypassing the main valve member 7, by way of which a choked fluid flow may take place into the secondary duct 6. In this case the current secondary pressure acts as an actuating pressure on the opening face 27, which is preferably constituted by the end face, adjoining the transfer opening 8, of the main valve member 7.

If the opening force $F_2$ should exceed the oppositely acting closing force $F_1$, the main valve member 7, which so far has been in the closed position in accordance with FIG. 3, will shift into the open position indicated in FIG. 4. As in the working example of FIG. 1 a threshold value for the secondary pressure may be set by the area ratio between the opening face 27 and the closing face 18, such threshold value being the value at which the main valve member 7 is switched over in the open position.

The closing face 18 in the working embodiment of FIGS. 2 through 7 is preferably formed by the end face, opposite to the opening face 27, of the main valve member 7. It delimits the first actuating chamber 23, which, via the intermediately placed auxiliary valve 27, is joined via the already mentioned first actuating duct 22 with the primary duct 5. The auxiliary valve 17 furthermore has a discharge duct 46 leading into the atmosphere. If the auxiliary valve 17 is in the non-actuated home position depicted in FIGS. 2 and 5, the terminal duct branch 22b, extending between the first actuating chamber 23 unit auxiliary valve 17, of the first actuating duct 22 will be relieved of pressure by way of the discharge duct 46, and simultaneously the initially placed duct branch 22a, leading to the primary duct 5, will be disconnected.

In the actuated open position of the auxiliary valve 17 the condition depicted in FIGS. 3, 4, 6 and 7 will result, in which the first actuating chamber 23 will be subjected to a control pressure arriving through the primary duct 5 producing the closing force $F_1$, such control pressure in this case corresponding to the primary pressure.

In the case of the second working embodiment the first actuating duct 22 has a double function. It acts, in a manner similar to the control duct 34 of the first working example, also as a duct via which the control valve means 16 is operated.

The control valve means 16 in the second working example of the softstart valve 1 comprises a control valve member 47 preferably coaxially extending through the main valve member 7 and being able to be switched over, in relation to the main valve member 7, parallel to the direction of the switch over movement 13 between two switching positions. An actuating portion 48 formed opposite to the closing face 18 and for instance in the form of a round plate, of the control valve member 47 constitutes, like the main valve member 7, a moving wall portion of the first actuating chamber 23 and is subjected to the fluid located in the first actuating chamber 23 in a closing direction 52. The control valve member 47 accordingly shifts into the above mentioned working position, in which by a closure portion 53 thereof axially opposite the main valve member 7 on the opposite side like the actuating portion 48, it shuts off a discharge opening 54 communicating with the secondary duct 6 (see FIGS. 3, 4, 6 and 7).

Figure 2:
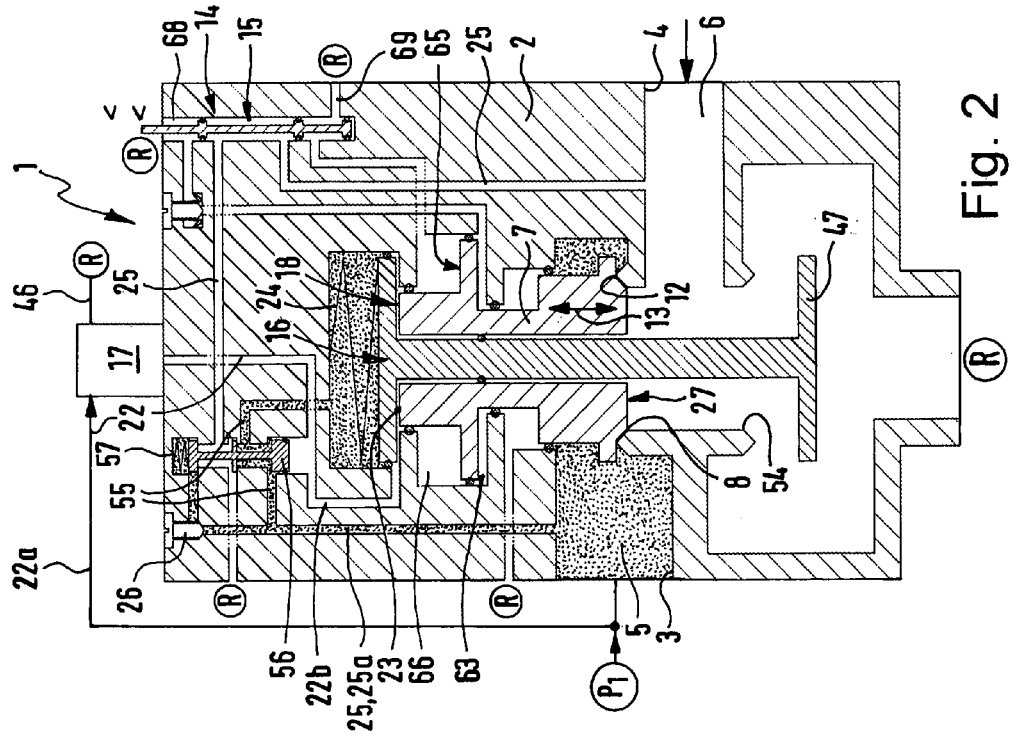

In the condition connected to be free of pressure, of the first actuating chamber 23 the control valve means 47, will assume, with the cooperation of the above mentioned first spring means 24, the discharge position depicted in FIGS. 2 and 5, in which its closure portion 53 is lifted clear of the discharge opening 54 so that the secondary duct 6 is connected with the atmosphere R.

If the primary pressure obtains in the primary duct 5 and if the auxiliary valve 17 is in the non-actuated home position the control valve member 47 will be additionally held by a fluid pressure signal in the discharge position. This will act on the actuating portion 48 on the side opposite to the first actuating chamber 23, to wit via a control duct 55 branching off from the initially placed duct branch 25a of the bypass duct 25, an additional auxiliary valve member 56 being placed on the control duct 55.

The additional auxiliary valve member 56 is so designed that it may be switched over between two switching position. Spring means 57 acting on it hold it in the first switching position, when the auxiliary valve 17 is not actuated. In this case the passage through the control duct 55 is open and fluid pressure signal (which holds the control valve member 47 in the discharge position) obtains. This first switching position will be seen from FIGS. 2 and 5.

When the auxiliary valve 17 is operated the pressure obtaining in the terminal duct branch 22b of the first actuating duct 22 will act oppositely to the spring means 57 on the additional auxiliary valve member 56 and will switch same into the second switching position illustrated in FIGS. 3, 4, 6 and 7, in which the passage through the control duct 55 is shut off and the duct branch 55a leading to the actuating portion 48 of the controlled duct 55 is connected by way of a discharge duct 58 with the atmosphere. Accordingly on switch over of the auxiliary valve 17 by cooperation with the additional auxiliary valve member 56 there will always be an opposite fluid action on the control valve member 47.

The additional auxiliary valve member 57 has a double function since it furthermore controls fluid flow through the first duct portion 43 of the initially placed duct branch 25b of the bypass duct 25. In the first switching position in accordance with FIGS. 3 and 5 the fluid flow is interrupted and simultaneously the duct portion leading to the switch over valve 15 by way of the discharge duct 58 is relieved of pressure. In the second switching position the fluid connection is open.

In addition to the opening face 27, which in the following is also termed the first opening face 27, there is an identically orientated second opening face 62 axially spaced from the main valve member 7. The face delimits, together with the valve housing 2, an actuating chamber 63, which is joined via an actuating duct 64 with the switch over valve 15.

Furthermore on the main valve member 7 there is a compensation face 63, which is oppositely orientated to the first opening face 27 and with the valve housing 2 delimits a compensation chamber 66, which is also connected with the switch over valve 15 a by way of a compensation duct 67.

The compensation face 65 is of the same size as the opening face 27.

In the switching position of the switch over valve 15 (FIGS. 2 through 4) predicating the secondary pressure controlled operational mode the switch over valve 15 frees the passage through the bypass duct 25 by connecting the two duct portions 43 and 44 with each other. Simultaneously the actuating chamber 63 and the actuating chamber 66 are connected with the atmosphere R by way of a respective discharge opening 68 and 69 for relief of pressure.

In the second switching position, setting the time controlled operational mode, of the switch over valve 15 (FIGS. 5 through 7) the switch over valve 15 will have connected the compensation duct 67 with the second duct portion 54 of the bypass duct 26 with the result that in the compensation chamber 66 the same pressure obtains as in the secondary duct 6 and accordingly owing to the identical size of the first opening face 27 and of the compensation face 65 there will be a force-related compensation of the secondary pressure as regards the main valve member 7. The secondary pressure is therefore so disconnected that it is without effect as regards force on the main valve member 7.

At the same time in the second switching position of the switch over valve 15 the actuating duct 64 is connected with the first duct portion 43 (of the bypass duct 25) coming from the choke means 26. Accordingly the second opening face 62 is acted upon by pressure medium flowing in from the choke means 26 and accordingly choked thereby so that the opening force $F_2$ is produced. By selection of a suitable area ratio between the second opening face 62 and the opposite closing face 18 the switching properties of the main valve member 7 may be influenced.

On the actuating duct 64 an additional choke means 72 is preferably placed which limits the flow rate of the pressure medium into the actuating chamber 63. It is preferably a question of an additional choke means 72 able to be adjusted as regards the intensity of its choking action.

Preferably the additional choke means 72 has a check valve 73 connected with it in parallel. This valve turns off in the direction toward the actuating chamber 63 and permits free fluid flow in the opposite direction.

The switch over valve may as illustrated be designed for manual operation. An electrically operated modification would however also be possible. However it is best to have a bistable design of the valve which remains in the respectively set position without application of energy until reswitched.

As regards closing spring 24 it is to be noted that in the non-actuated state of the auxiliary valve 17 it may act via the control valve member on the main valve member 7. The actuating portion 48 of the control valve member 47, acted upon by it, is thrust against the closing face 18 and holds the main valve member 7 accordingly in the closed position.

In the following the normal manner of operation of the second working embodiment of the softstart valve means 1 will be explained with reference to FIGS. 2 through 7.

FIGS. 2 through 4 show the softstart valve 1 in the secondary pressure controlled operational mode, i.e. with the switch over valve 15 in the first switching position. FIGS. 5 through 7 show the purely time controlled mode, independent of the secondary pressure, as entailed by the switch over valve 15 in its second switching position.

If the auxiliary valve 17 is not actuated, then there will be identical basic conditions of the two operational modes, which are illustrated in FIGS. 2 and 5. The pressure medium in the primary duct 5 is prevented by the additional auxiliary valve member 56 from flowing through the bypass duct 25 and is simultaneously switched through to the control valve member 47 as a fluid pressure signal with the result that the control valve means 16 assumes the discharge position.

The secondary duct 6 is consequently relieved of pressure and the main valve member 7 is in the closed position.

The secondary pressure dependent operational mode is as follows (see FIGS. 3 and 4).

On actuation of the auxiliary valve 17 the control valve member 47 is switched over into the working position. The additional auxiliary valve member 56 opens the passage through the bypass duct 25 so that the pressure medium—choked by the choke means 26—will transfer via the bypass 25 and via the switch over valve 15 into the secondary duct 6. Owing to such choking action the secondary pressure will only gradually increase so that the connected loads are supplied with pressure relative gently and there are no undesired pressure surges.

The gradually increasing secondary pressure will from the start act on the first opening face 27, the setting force exerted by it acting against the closing force. The latter results from the primary pressure obtaining in the first actuating chamber 23 and acting on the closing face 18.

Should the setting force resulting from the secondary pressure exceed the opening force $F_2$, the main valve member 7 will switch over from the closed position assumed in FIG. 3 into the open position depicted in FIG. 4. Since the main valve 7 can move in relation to the control valve member 47, the latter is not affected by the switch over movement.

Since the main valve is now open fluid may flow without hindrance at the maximum rate directly between the primary duct 5 and the secondary duct 6.

In order to relieve the secondary duct 6 of pressure again it is sufficient to deactivate the auxiliary valve 17. Then the conditions of FIG. 2 will obtain again.

In order to change into the time dependent operational mode a simple switch over of the switch over valve 15 into the second switching position indicated in FIGS. 5 and 7 is sufficient. Starting with the home position of FIG. 5 there will, in this operational mode, on actuation of the auxiliary valve 17, the following course of events (see FIGS. 6 and 7). The bypass duct 25 is interrupted by the switch over valve 15 so that through it no passage of fluid is possible from the primary duct 5 to the secondary duct 6. The second duct portion 44 opening into the secondary duct 6 is joined by the switch over valve 15 with the compensation chamber 66 so that the secondary pressure is compensated in force at the main valve member 7 and it does not have any further effect on the position of the main valve member 7.

Simultaneously the first portion 42, lying downstream from the choke means 26, of the bypass duct 25 is joined with the actuating chamber 63. Accordingly choked pressure medium will flow into the latter from the primary duct 5, such medium exerting a gradually waxing setting force on the second opening face 62.

Owing to this gradual increase in setting force the main valve member 7 will perform a continuous opening movement in the course of which it opens direct fluid passage between the primary duct 5 and the secondary duct 6. At 74 a randomly selected intermediate position of the main valve member 7 is indicated which same assumes on its way into the open position depicted in FIG. 7 for a short time.

In the case of this gradual opening of the main valve member 7 the secondary pressure gradually rises and entails a gentle action of pressure on the connected loads.

It is only when, owing to the action of pressure in the actuating chamber 63, the opening force $F_2$ is reached as determined by the area ratio between the second opening face 62 and the opening face 18, that the main valve member 7 switches over into the open position as illustrated in FIG. 7 so that now unchoked and direct fluid transfer is possible between the primary duct 5 and the secondary duct 6.

The opening of the main valve member 7 takes place in this operational mode purely under time control, i.e. dependent on the time, which is required by the pressure medium flowing via the two choke means 26 and 73 into the actuating chamber 63 to attain the necessary opening pressure. It is in this manner that a reliable opening may be ensured even if the build up of the secondary pressure 6 is delayed for some reason. Under such unfavorable conditions a switch over into the open position may be entailed.

Since the additional choke means 72 is arranged in the actuating duct 64 it is only effective in the time controlled operational mode. Accordingly for this mode a special or independent flow rate can be set, which as a rule is substantially smaller than that which is required for secondary pressure controlled operation and in this case is set by the choke means 26. The different flow rates are to be aimed at because the volume (of the compensation chamber 66) to be filled in the time controlled operational mode for causing the switch over movement of the main valve member 7, is substantially less than the volume to be filled in secondary pressure dependent operation, namely the volume of the loads connected with the secondary duct 6.

In the time controlled operational mode as well the basic condition illustrated in FIG. 5 may be quite simply restored by switching the auxiliary valve 17 back into the non-actuated position. The actuating chamber 63 is then relieved of pressure by way of the actuating duct 64, the first duct portion 43 and the discharge duct 58. The check valve 73 ensures in this case a rapid venting at the additional choke means 73.

In the two working examples it is an advantage if all components of the softstart valve 1 are collected together as a valve unit so that as regards fluid flow only the inlet port 3 and the outlet port 4 must be connected with corresponding lines. In this case the first actuating duct 22 depicted as partially extending outside the valve housing 2 may be a component of the valve unit.

The design of the softstart valve 1 as a valve unit also involves the substantial advantage of a possibility of employment as a module in a modularly designed compressed air servicing device.

The invention claimed is:

1. A softstart valve means, comprising a main valve member placed between a primary duct conducting pressure medium at a primary pressure and a secondary duct, said main valve member being biased, or able to be biased by a closing force into a closed position disconnecting the connection between the primary duct and the secondary duct, said main valve member being able to be switched over by an oppositely acting opening force overriding the closing force into an open position opening the connection between the primary duct and the secondary duct, the opening force being derived in a secondary pressure controlled operational mode of the valve means by the gradually increasing secondary pressure of the pressure medium, such pressure medium flowing, bypassing the main valve member, via a choke means from the primary duct into the secondary duct, wherein switch over means are present which permit the switching over of the operational mode of the valve means between the secondary pressure controlled operational mode and a time controlled operational mode switching over the main valve independently of the secondary pressure purely time dependent into the open position, and wherein the secondary pressure in the time controlled operational mode is switched to be devoid of force effects as regards the main valve member and the main valve member, instead of this, for producing the opening force is acted upon in the opening direction by a pressure medium flowing in in a choked manner without any connection with the secondary duct.

2. The softstart valve means as set forth in claim 1, wherein, in the time controlled operational mode, there is such a fluid circuiting arrangement that the choked flow of the pressure medium, responsible for producing the opening force, takes place via the choke means, whose outlet is in this case disconnected from the secondary duct.

3. The softstart valve means as set forth in claim 2, wherein the setting force, acting in the time controlled operational mode in the opening direction on the main valve member and gradually increasing owing to the choked flow supply, entails a gradual switch over of the main valve member into the open position and accordingly causes a transfer flow of the pressure medium from the primary duct into the secondary duct with an increasing flow rate.

4. The softstart valve means as set forth in claim 2, wherein, on the fluid connection, present in the time controlled operational mode, between the choke means and an opening face to be acted upon by the pressure medium, of the main valve member there is an additional choke means, independent of the choke means, such additional choke means having no function during the secondary pressure controlled operational mode.

5. The softstart valve means as set forth in claim 4, wherein the additional choke means is connected in parallel with a check valve permitting return flow of the fluid.

6. The softstart valve means as set forth in claim 1, wherein the force-relevant lack of effect in the time controlled operational mode of the secondary pressure, as regards the main valve member is produced because the secondary pressure is applied to two oppositely placed actuating faces of equal size of the main valve member and the setting forces resulting from this neutralizing each other.

7. The softstart valve means as set forth in claim 1, wherein, in the time controlled operational mode, there is such a fluid circuiting arrangement that the choked flow responsible for producing the opening force is via a further choke means which is present in addition to the choke means, the fluid connection between the secondary duct and the main valve member present in the secondary pressure dependent operational mode for producing the opening force, being simultaneously interrupted.

8. The softstart valve means as set forth in claim 7, wherein the main valve member has a closing face subjected to a control fluid at a control pressure for producing the closing force and has an oppositely orientated opening face, the switch over means being so designed that the closing face both in the secondary pressure controlled operational mode and also in the time controlled operational mode is acted upon by the control pressure, whereas the opening face is subjected to pressure in the secondary pressure controlled operational mode from the secondary duct and in the time controlled operational mode is acted upon via the further choke means wherein the secondary duct is disconnected.

9. The softstart valve means as set forth in claim 8, wherein the control pressure in produced by the primary pressure tapped from the primary duct.

10. The softstart valve means as set forth in claim 1, wherein the switch over means comprise a switch over valve to be operated for changing the operational mode and which is able to selectively assume a first switching position setting the secondary pressure controlled operational mode or a second switching position setting the time controlled operational mode, it producing in both such switching positions the different fluid circuit states responsible for the production of the opening force acting on the main valve member.

11. The softstart valve means as set forth in claim 10, wherein the switch over valve is designed to be manually actuated.

12. The softstart valve means as set forth in claim 10, wherein the switch over valve is a bistable valve.

13. The softstart valve means as set forth in claim 1, further comprising control valve means which is able to be selectively set in a working position or in a discharge position, such control valve means separating the secondary duct in the discharge position from the primary duct and simultaneously connecting it with the atmosphere and which clears the secondary duct for allowing fluid passing through in the working position while simultaneously disconnecting it from the atmosphere.

14. The softstart valve means as set forth in claim 13, wherein an electrically controlled auxiliary valve is present for actuation of the control valve means.

15. The softstart valve means as set forth in claim 1, wherein the valve means is designed in the form of a valve unit with an inlet port for the primary duct and an outlet port for the secondary duct.

16. The softstart valve means as set forth in claim 1, wherein the valve means is a component of a compressed air service device.

17. A softstart valve means, comprising a main valve member placed between a primary duct conducting pressure medium at a primary pressure and a secondary duct, said main valve member being biased, or able to be biased by a closing force into a closed position disconnecting the connection between the primary duct and the secondary duct, said main valve member being able to be switched over by an oppositely acting opening force overriding the closing force into an open position opening the connection between the primary duct and the secondary duct, the opening force being derived in a secondary pressure controlled operational mode of the valve means by the gradually increasing secondary pressure of the pressure medium, such pressure medium flowing, bypassing the main valve member, via a choke means from the primary duct into the secondary duct, wherein switch over means are present which permit the switching over of the operational mode of the valve means between the secondary pressure controlled operational mode and a time controlled operational mode switching over the main valve independently of the secondary pressure purely time dependent into the open position, and wherein the main valve member has a closing face, subjected to control fluid under a control pressure, for producing the closing force, and furthermore a first opening face acted upon in the opening direction by the secondary pressure obtaining in the secondary duct, and furthermore a compensation face orientated oppositely to the first opening face and of equal size to the latter, and finally a second opening face with the same orientation as the first opening face, the switch over means being so designed that in the secondary pressure controlled operational mode the compensation face and the second opening face are not acted upon and merely the closing face and the first opening face are subjected to fluid actuation and that in the time controlled operational mode while maintaining the fluid action on the closing face and on the first opening face in addition the compensation face is connected with the secondary duct and the second opening face in connected with the outlet of the choke means.

18. The softstart valve means as set forth in claim 17, wherein, on the connection between the choke means and the second opening face, there is an additional choke means and there is also a check valve connected in parallel to same to shut off flow to the choke means.

19. The softstart valve means as set forth in claim 17, wherein the control pressure effective at the closing face is constituted by the primary pressure tapped from the primary duct.

* * * * *